United States Patent [19]

Mendicino

[11] Patent Number: 4,667,431
[45] Date of Patent: May 26, 1987

[54] SHARK PROD

[76] Inventor: Lyle J. Mendicino, 11396 Royal Palm Blvd., Coral Springs, Fla. 33065

[21] Appl. No.: 831,483

[22] Filed: Feb. 20, 1986

[51] Int. Cl.$^4$ ............... H05C 1/00; A01K 81/04; F41B 5/02
[52] U.S. Cl. .................. 43/6; 273/84 ES; 361/232
[58] Field of Search ............ 43/6, 17.1, 98; 231/7; 273/84 ES; 361/232

[56] References Cited

U.S. PATENT DOCUMENTS

| | | | |
|---|---|---|---|
| 2,805,067 | 9/1957 | Ryan | 43/6 X |
| 2,981,465 | 4/1961 | Bartel | 43/98 X |
| 3,058,252 | 10/1962 | Matusche | 43/17.1 |
| 3,362,711 | 1/1968 | Larsen et al. | 273/84 ES |
| 3,484,665 | 12/1969 | Mountjoy et al. | 43/6 X |
| 3,626,626 | 12/1971 | Blanc | 43/6 |
| 3,771,249 | 11/1973 | Johnson et al. | 43/6 |
| 4,167,036 | 9/1979 | Kenney | 231/7 X |
| 4,394,956 | 7/1983 | Andrews et al. | 231/7 |

FOREIGN PATENT DOCUMENTS 1448644  9/1976  United Kingdom ............ 231/7

Primary Examiner—Kuang Y. Lin
Assistant Examiner—Carmine Cuda
Attorney, Agent, or Firm—Oltman and Flynn

[57] ABSTRACT

A waterproof casing electrically insulates an electric power supply and circuitry to permit underwater operation of a fish repelling electrical prod. The prod includes a switching device telescopically mounted inside a tube with sliding, waterproof seals whereby upon impact with a fish, a pair of electrically conductive prongs are energized thus repelling the fish.

14 Claims, 14 Drawing Figures

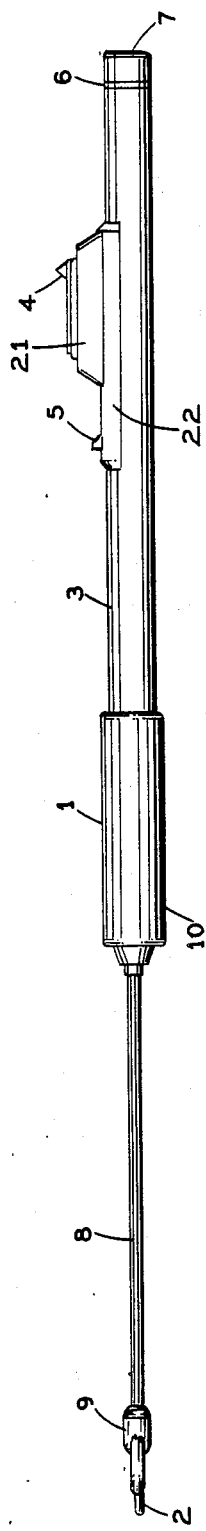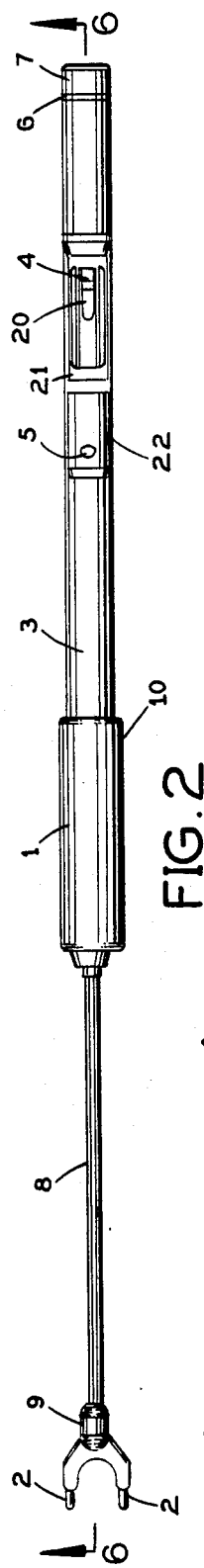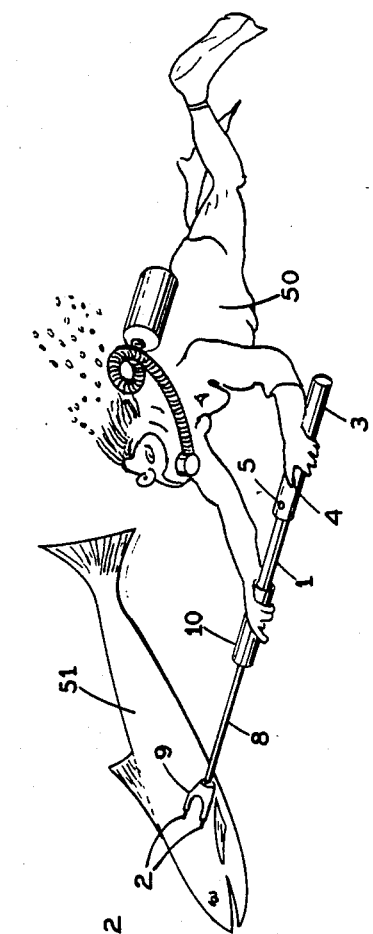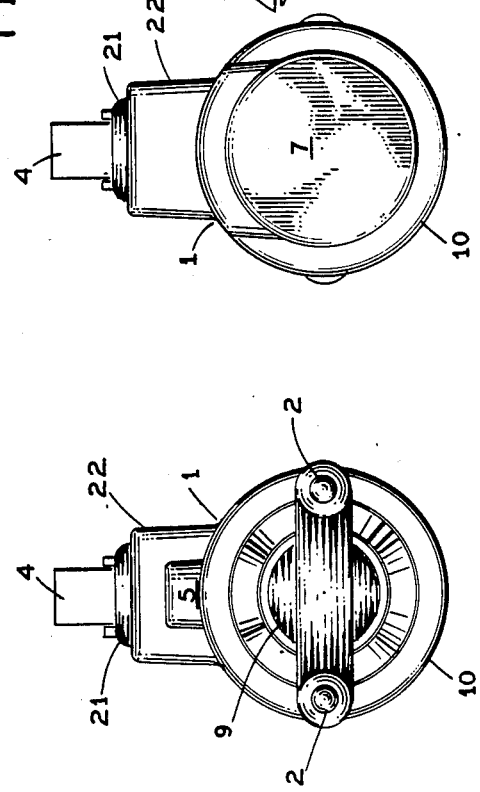

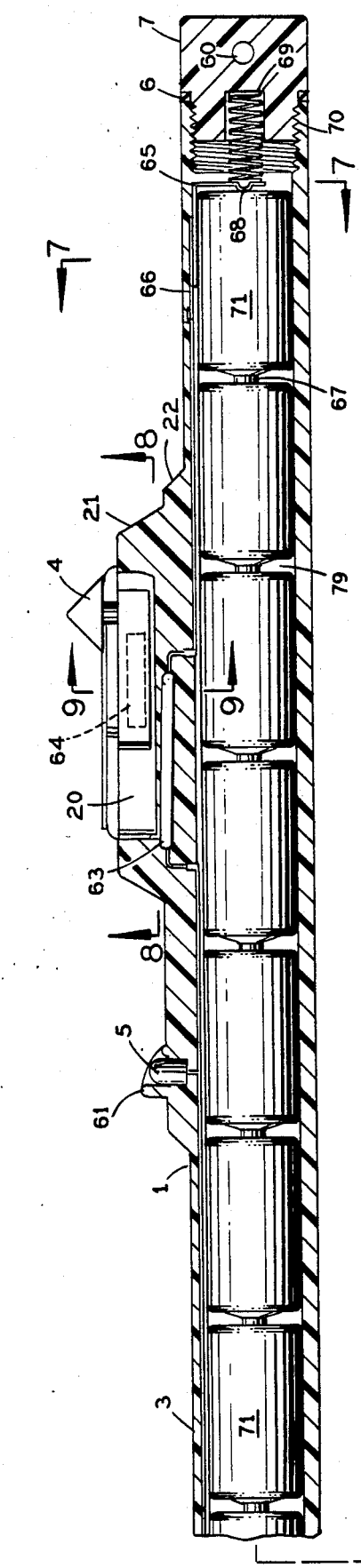
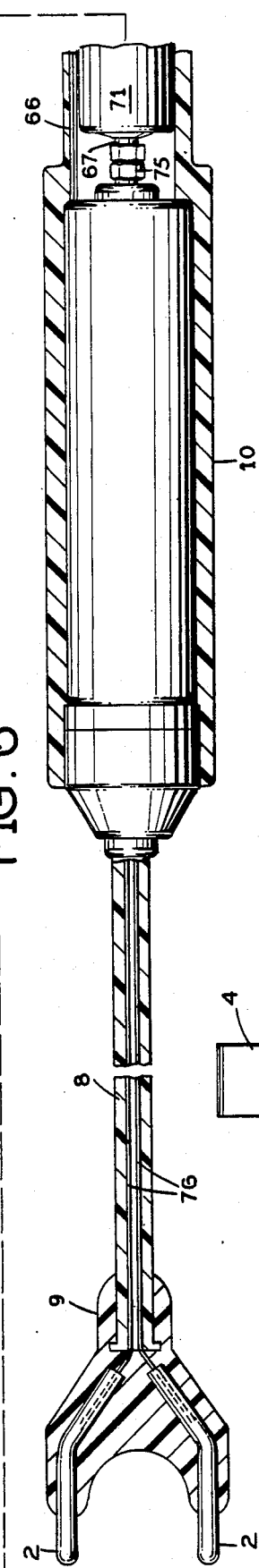
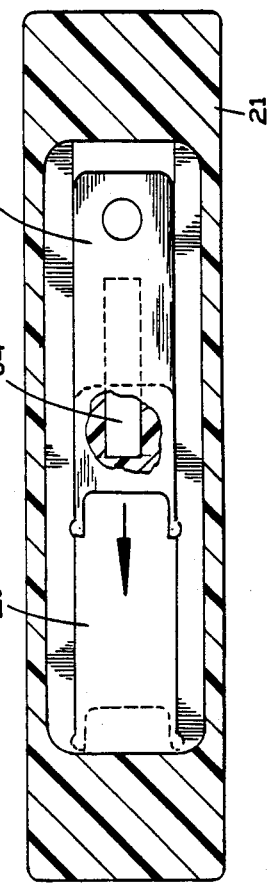
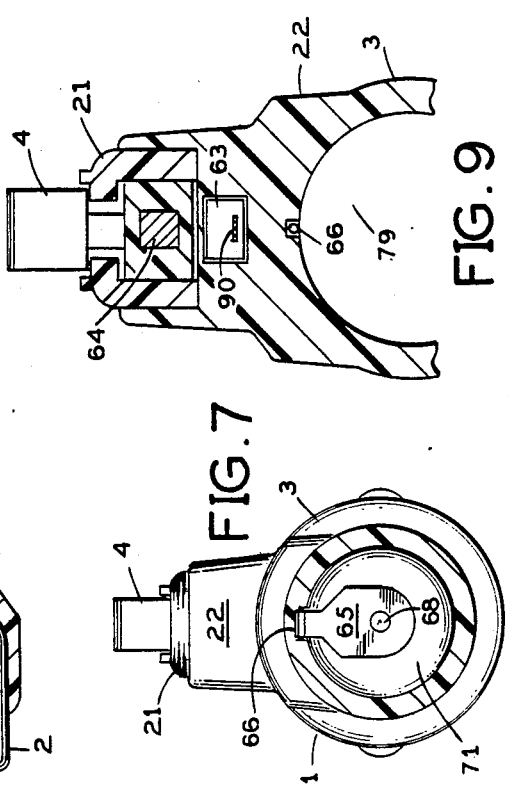
FIG. 6
FIG. 7
FIG. 8
FIG. 9

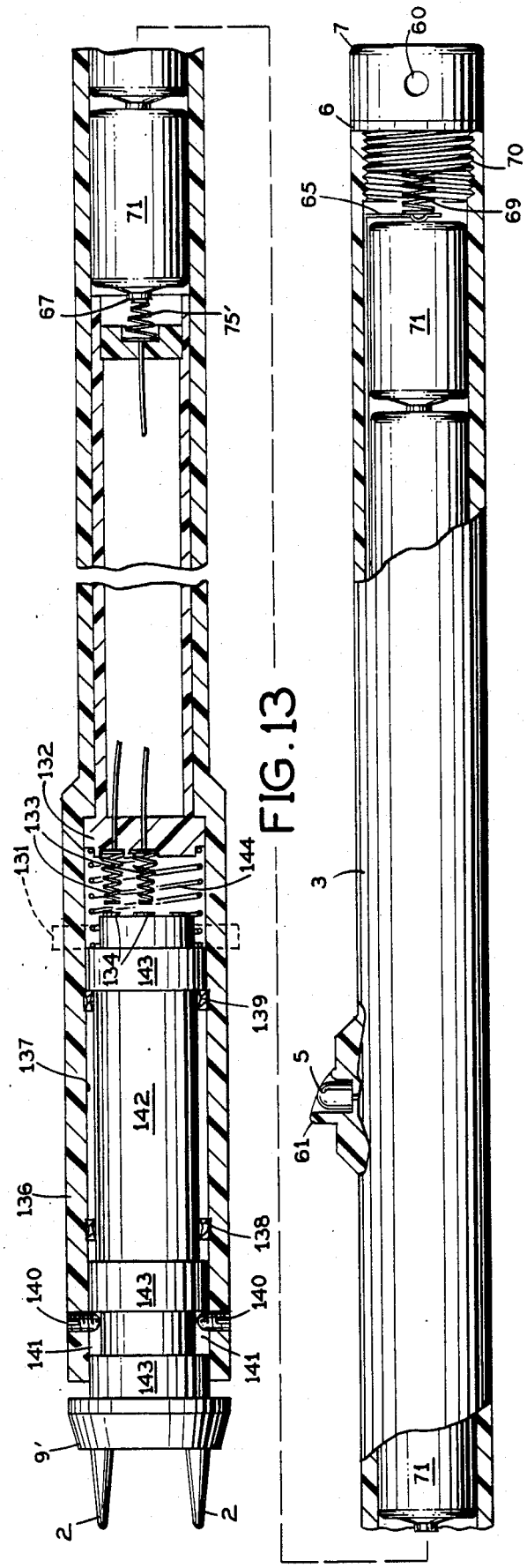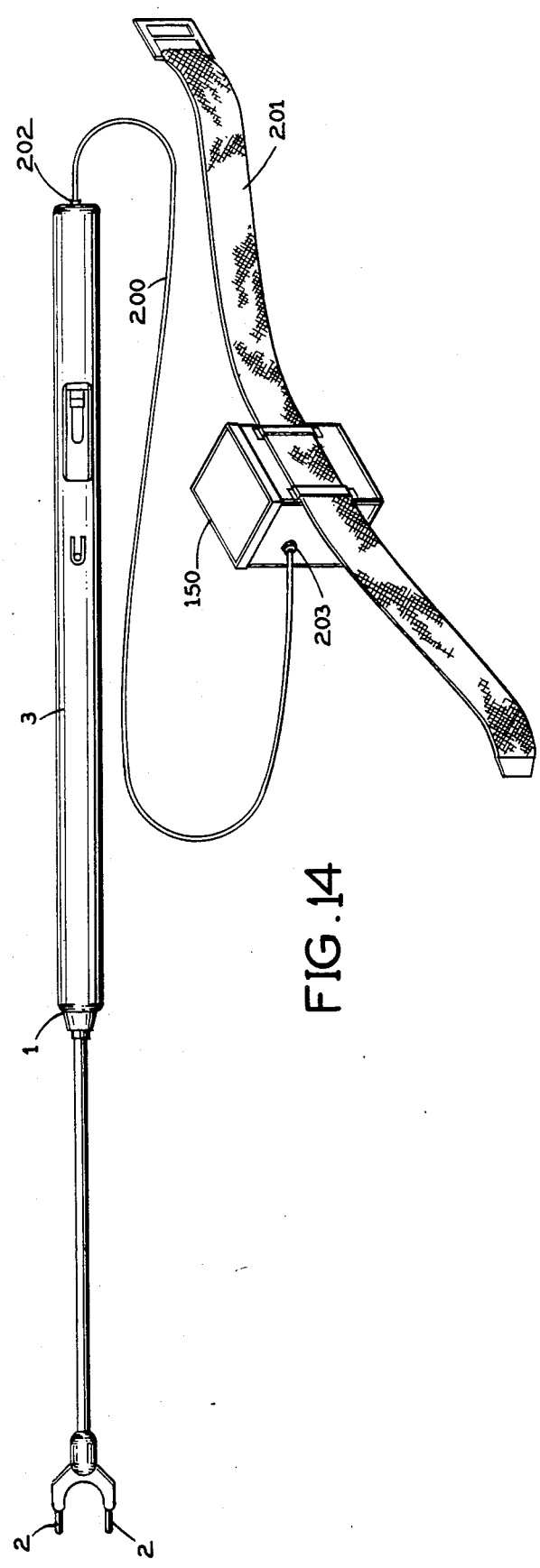
FIG. 13
FIG. 14

SHARK PROD

FIELD OF THE INVENTION

The present invention relates to underwater survival gear for divers. Proper self defense against large intruding fish can save a diver's life. The present invention operates under water similarly to a cattle prod above the water.

BACKGROUND OF THE INVENTION

Traditional self defense weapons against sharks include shark darts having $CO_2$ charged pointed spears. These spears piece the shark's skin and then explosively release $CO_2$ gas inside the shark skin blowing them apart. Great amounts of blood are released into the water by this method. Thus, whether the shark lives or dies, the blood attracts other sharks and increases the peril to the diver. Bangsticks are touch sensitive shotgun shells mounted on sticks. Hitting the shark detonates the charge and repels the shark. However, the same problem of blood in the water results from this method. Further dangers from explosive tip devices exist due to accidental discharge. A bangstick doesn't know if it is a shark or your foot that has detonated it. Diving often involves climbing around rocking boats full of gear on the decks. Touch sensitive explosives are very hazardous for divers in these conditions.

Although shark research is a continuing science, it is known that a shark's migration habits are based on its electrical sensitivity to the earth's magnetic field. Sharks apparently are much more sensitive to bursts of high amperage rather than high voltage on their skin. By introducing about 500 volts with amperages ranging from one to five in close proximity to a shark's skin, the shark is temporarily incapacitated. Maximum effect is gained by sticking the shark prod into the shark's snout.

Sharks have special electrical sensory organs called ampulla of Lorenzini located in their snouts. These organs operate in part by openings in the shark's skin at the snout. Thus the present invention serves to debilitate a shark by two methods. The shock stuns the ampulla of Lorenzini organs and overcharges the body's overall tolerance to electricity. Since sharks seem rather insensitive to pain as we know it, the present invention has two principal effects. The first is to surprise the shark and make him dart away. The second is to actually incapacitate the shark by numbing all of his electrical sensors.

Similar devices used on land include cattle prods, dog training devices and human crowd control tazors. These devices are designed for mammals who are sensitive to high voltages such as 40,000 volts with low amperages in the milliamp range.

Underwater prods require proper low voltage high amp circuitry and pulse rates, pressure proof casing and rugged construction to withstand banging against heavy objects at either end of the prod.

SUMMARY OF THE INVENTION

It is, therefore, the object of the present invention to provide a battery powered shark prod having a high amp (1-5 amps) low volt (300-1000 volts) pulsating charge to repel sharks.

Another object of the present invention is to provide a rugged pressure proof casing which prevents leaks from disabling the electrical circuitry inside the prod.

Another object of the present invention is to provide a casing for the prod which in dire emergency could serve as an underwater billy club for the diver.

Another object of the present invention is to provide a simple switch and indicator light on the prod to enable a diver under severe nervous stress to properly operate the prod.

Another object of the present invention is to provide an embodiment which automatically turns "on" upon pressing the electric prongs against a fish. This embodiment maximizes the diver's response time in an emergency.

During actual use the diver switches the prod on upon sensing the fish too close to him for comfort. Electrical discharge occurs immediately through the water between the electrical tips of the prod. A shark repelling electrical field is created around the tips of the prod. Bringing the prod in close proximity to a shark repels the shark. Maximum effect occurs when sharpened prod tips are used to pierce the shark's nose.

The present invention, unlike high voltage cattle prods, does not stun a diver. Thus a practical means for detering sharks is created without dangerous side effects for the diver.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 1 is a left side elevational view of the shark prod.

FIG. 2 is a top plan view of the shark prod.

FIG. 3 is a front elevational view of the shark prod (a shark's eye view).

FIG. 4 is a rear elevational view of the shark prod.

FIG. 5 is a perspective view of a diver using the shark prod to defend himself against an intruding shark.

FIG. 6 is a sectional view of the shark prod taken along line 6—6 of FIG. 2. Dotted lines indicate that the two halves depicted represent one shark prod.

FIG. 7 is a cross section taken along line 7—7 of FIG. 6.

FIG. 8 is a fragmentary sectional view of the waterproof switch mechanism taken along line 8—8 of FIG. 6.

FIG. 9 is a cross section of the waterproof switch mechanism taken along line 9—9 of FIG. 6.

FIG. 13 is a fragmentary sectional view of an embodiment of the shark prod which has an automatic contact activated switch.

FIG. 14 is a left side elevational view of an embodiment of the shark prod having a remote D.C. power supply.

DETAILED DESCRIPTION

Figure 10:
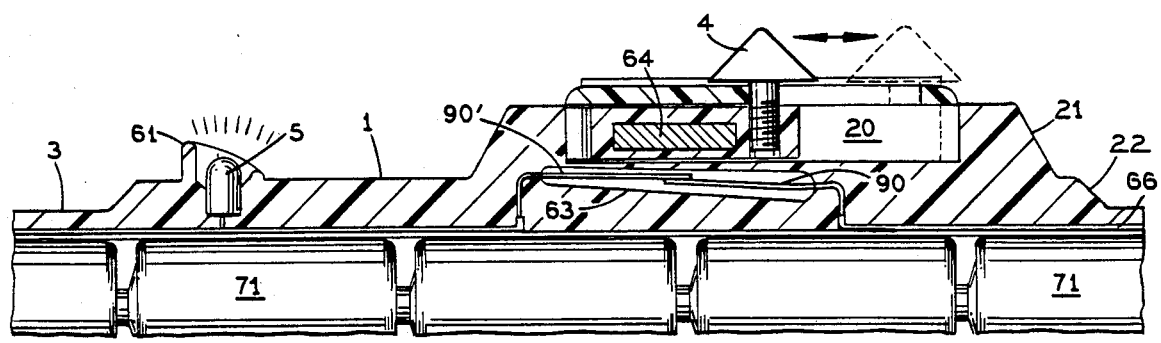
FIG. 10 is a fragmentary sectional view of the waterproof switch mechanism. Dotted lines show the switch in the "OFF" position.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

Referring first to FIG. 1, the action end of the shark prod 1 has prongs 2. The diver holds the handle 3 and pushes switch 4 forward to activate the prongs. Light Emitting Diode (L.E.D.) 5 indicates the shark prod is "ON." O-ring gasket 6 provides a waterproof seal for handle base 7. Extension arm 8 is rigid and contains lead wires to prongs 2 from the D.C. to D.C. converter compartment 10. Y-shaped insulated mounting bracket 9 holds the prongs 2 apart.

FIG. 2 shows the separation of the two prongs 2 as determined by the shape of insulated mounting bracket 9. Under water with switch 4 "ON" an electrical field is set up between prongs 2 by the D.C. to D.C. converter in compartment 10. The waterproof switch 4 slides along groove 20. Groove 20 is located on top of switch housing 21 which rests atop control base 22. A waterproof casing comprising insulated mounting bracket 9, extension arm 8, compartment 10, handle 3, handle base 7, control base 22 and switch housing 21 electrically insulates all internal parts (see FIG. 6). Waterproof connotes pressure-proof underwater to at least a depth of 300 feet.

FIG. 3 is a shark's view of the shark prod 1 coming at him. The prongs 2 are out in front held apart by the insulated mounting bracket 9.

FIG. 4 displays the streamline no-snag design of the shark prod 1. It is imperative to have a no-snag design to avoid entanglement with seaweed and other debris. Handle base 7 not only holds batteries in place (see FIG. 6) but can serve in an emergency as a billy club for self defense against any large fish. Control base 22, switch housing 21 and switch 4 are centrally located and prominant for fast accessibility in an emergency.

FIG. 5 shows a diver 50 defending himself from an intruding shark 51 by holding the shark prod 1 along the handle 3 with the switch 4 "ON", as indicated by L.E.D. 5, and jabbing the prongs 2 into the shark 51.

FIG. 6 shows the sectional view of shark prod 1. Handle base 7 is screwed tightly against O-ring 6 by means of threads 70. This keeps the battery compartment area 79 waterproof. Hole 60 may be used for a hand strap or mounting means (not shown). Spring 69 pushes against conductive bracket 65 thus making electrical contact with the battery 71 at the negative base contact 68. (Ideally the batteries 71 are 1.5 volt nickel cadmium for long life. They should be stored dry after use and tested for strength before each use for maximum safety). Negative lead wire 66 imbedded inside the battery compartment 79 electrically contacts conductive bracket 65. Negative lead wire 66 electrically connects to a magnetically activated reed switch 63. When switch 4 moves forward along groove 20 a magnet 64 imbedded in switch 4 moves over reed switch 63 thus completing the shark prod's electrical circuit and actuating both the L.E.D. 5 and the prongs 2. Lip 61 protects L.E.D. 5. Battery 71 positive contact 67 connects in series with a total of eight batteries. Positive junction 75 electrically conducts approximately 12 volts D.C. into D.C. to D.C. converter circuit C (see FIG. 12). Pulsating D.C. charges are conducted along lead wires 76 to prongs 2.

FIG. 7 shows a cross section of the rear of shark prod 1 without the handle base 7. Conductive bracket 65 electrically contacts battery 71 at the negative base contact 68. Negative lead wire 66 conducts electricity into control base 22.

FIG. 8 shows how activating magnet 64 is imbedded in switch 4. As switch 4 moves forward along groove 20 it closes reed switch 63 (see FIG. 6).

FIG. 9 shows how the magnet 64 is imbedded inside switch 4 in close proximity to reed switch 63. Inside reed switch 63 is contact 90. The mating contact 90' can be seen in FIG. 10.

FIG. 10 shows how moving switch 4 forward to the "ON" position draws contacts 90 and 90' into electrical contact inside reed switch 63. This completes the electrical circuit of shark prod 1 and lights up L.E.D. 5 and powers prongs 2 (see FIG. 6).

Figure 11:
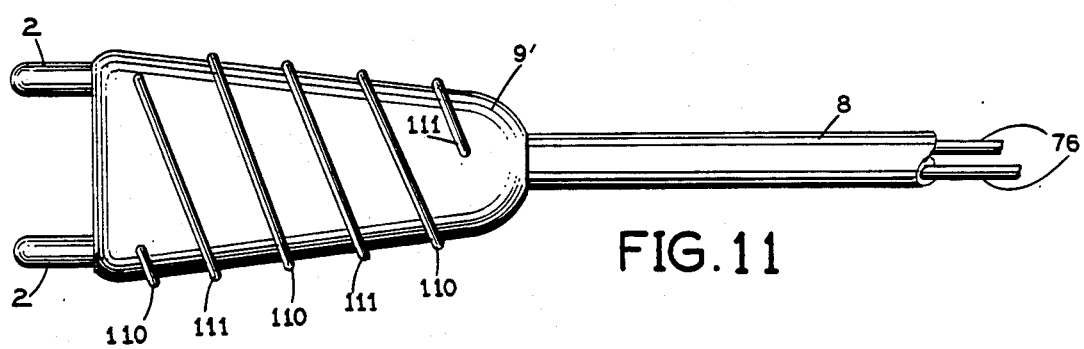
FIG. 11 is a top plan view of an embodiment of the prongs having exposed lead wires on the base.

FIG. 11 shows an alternative embodiment of insulated mounting bracket 9'. Lead wires 76 are exposed as leads 110 and 111 on the side of insulated mounting bracket 9' for extra touching area against a large fish.

Figure 12:
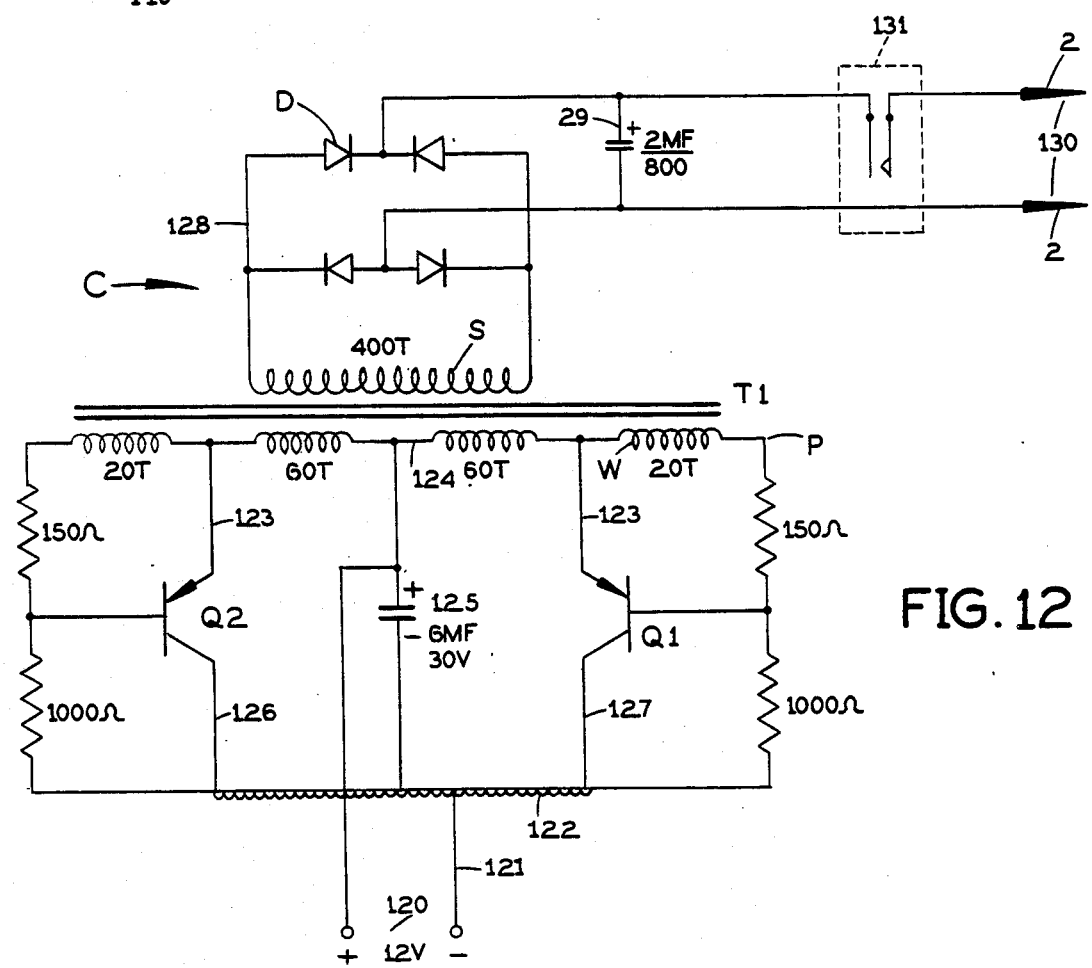
FIG. 12 is an electrical schematic of the D.C. to D.C. converter shown in FIGS. 6 and 13.

FIG. 12 is a schematic of the D.C. to D.C. converter circuitry depicted as C in FIGS. 6 and 13. The D.C. power source 120 is supplied by means of either batteries 71 as depicted in FIG. 6 or belt mounted battery pack 150 as depicted in FIG. 14. Negative leg 121 is electrically connected to a heat sink 122 which preferably is the handle 3 depicted in FIG. 6. All electrical values shown are not limiting restrictions for this patent. They are merely suggested values to assist one skilled in the art to reduce the circuitry to practice.

D.C. to D.C. converter C consists of two transistors Q1 and Q2 (Texas Instruments TIP-30) connected as a push-pull oscillator 123 which drives transformer T1 which is wound on a powder core (not shown - TDK No. H7C1 EL302 or TDK HSA 4307 with matching bobbins). The primary winding P has windings W. The center 124 of primary winding P connects to plus 12 D.C. volts and a capacitor 125 as shown. Collectors 126 and 127 of transistors Q2 and Q1 respectively are connected to heat sink 122. Transformer P has a secondary winding S (400 turns, 30 AWG double enamel). Secondary winding S connects to a four-way rectifier 128 having four rectifier diodes D (IN 914 Motorola). Rectifier 128 connects to capacitor 129 which stores an electrical charge until a conductive material 130 such as shark flesh passes between prongs 2. Upon such occurrences capacitor 129 discharges electricity across prongs 2. Embodiment 131 shown in dots represents the schematic of the automatic ON and OFF switch shown in FIG. 13.

FIG. 13 shows an automatic ON and OFF switch embodiment of the shark prod wherein prongs 2 move contacts 134 into spring contacts 133 thereby activating prongs 2 as described in FIG. 12. The switch 131 is comprised of contacts 134 and spring contacts 133 as depicted by dotted area 131 (see schematic in FIG. 12). For safety purposes L.E.D. 5 indicates when prongs 2 are electrically activated by switch 131. The switch 131 is comprised of stationary spring contacts 133 which are mounted on stopper 132. Stopper 132 forms a waterproof seal inside cylindrical compartment 137 which is the inside of extension tube 136. Contacts 134 align with spring contacts 133. Contacts 134 are affixed to plunger 142 which is affixed to insulated mounting bracket 9' which holds prongs 2. Prongs 2 are shown sharpened in this embodiment. Plunger 142 slides inside compartment 137 by means of collars 143. Two sets of quad X seals, 138 and 139, offer quadruple waterpoof protection for switch 131.

In operation prongs 2 are pushed against a shark which moves plunger 142 into spring contacts 133 thereby closing switch 131. After contact with the shark is broken spring 144 pushes plunger 142 back to the "OFF" position. Set screw 140 projecting into groove 141 retain the plunger 142 inside extension tube 136. Positive battery spring contact 75' is an alternate contact embodiment for supplying D.C. voltage from batteries 71 into D.C. to D.C. converter C.

FIG. 14 shows a belt mounted D.C. power source 150. It could be used on either embodiment of the shark prods depicted in FIGS. 6 or 13. Belt 201 holds one or more D.C. power sources 150. Waterproof connector 203 can be of a snap-on type to enable the diver to change power sources under water (not shown). Waterproof cable 200 carries D.C. power into shark prod 1 by means of a waterproof connection 202.

I claim:

1. A fish repelling electrical prod comprising:
   means for supplying electric power;
   ON and OFF switching means;
   power converter circuitry;
   at least one insulated mounting bracket;
   at least two electrically conductive prongs;
   said prongs further comprising electric connecting circuitry to electrically connect said power converter circuitry to said ON and OFF switching means whereby said power converter circuitry operates to repel fish by discharging electricity into said prongs when said switching means are ON and said electrically conductive prongs further have electrically conductive matter including sea water or fish flesh between them;
   said prongs affixed within said mounting bracket wherein said prongs are electrically insulated from one another and are projecting outward in a manner suitable to allow simultaneous jabbing of said prongs into a large object;
   a waterproof casing electrically insulating said means for supplying electric power, said ON and OFF switch means, said power converter circuitry and said electric discharge means, thus functioning to permit underwater operation of said fish repelling electrical prod; and
   said ON and OFF switching means further comprising:
   the insulated mounting bracket consisting of a cylindrical shape;
   said insulated mounting bracket affixed to a tube;
   said insulated mounting bracket slidingly engaged inside said tube at one end of said tube;
   said insulated mounting bracket further comprising electrical connections at the base away from said prongs which are electrically connected to said prongs;
   said tube further comprising a waterproof stopper;
   said stopper further comprising electrically conductive springs cooperating with said electrical connections of said insulated mounting bracket functioning to complete said power converter circuitry when said prongs are pushed against a solid object;
   said insulated mounting bracket further comprising means for a sliding waterproof seal adjacent to said tube.

2. The fish repelling electrical prod of claim 1 wherein said power converter circuitry further comprises at least one transistor, a transformer, a rectifier and a storage capacitor operatively interconnected.

3. The fish repelling electrical prod of claim 1 wherein said ON and OFF switching means further comprises a sliding switch mounted on said casing;
   said sliding switch further comprising a magnet and a reed switch cooperating therewith such that sliding said switch to the ON position moves said magnet over said reed switch thereby completing said electrical circuitry connecting said power supplying means to said power converter to said prongs.

4. The fish repelling electrical prod of claim 1 wherein the power supply means further comprises a belt mounted 12 volt battery pack having waterproof lead wires electrically connected to said ON and OFF switching means.

5. The fish repelling electrical prod of claim 1 wherein said prongs have sharpened tips capable of piercing the skin on a shark's snout.

6. The fish repelling electrical prod of claim 1 wherein said waterproof casing further comprises a rigid shockproof construction capable of functioning as a billy club while protecting said power converter circuitry.

7. The fish repelling electrical prod of claim 1 further comprising a snag resistant streamlined construction.

8. The fish repelling electrical prod of claim 1 wherein said power converter circuitry further comprises:
   at least one transistor connected to a transformer wound on a powder core;
   said transformer further comprising a primary winding;
   said primary winding having a center tap connected to said means for supplying electric power and a capacitor;
   a heat sink;
   the collector of said transistor connected to said heat sink;
   said transformer having a secondary winding;
   said secondary winding connecting to a four-way rectifier having four rectifier diodes;
   said four-way rectifier having outputs connected to a capacitor wired in parallel with said prongs whereby electrical power in the range of 300 to 1000 volts and one to five amperes pulsatingly discharges across said prongs when said prongs simultaneously contact a conductive material such as fish flesh.

9. The fish repelling electrical prod of claim 1 wherein said means for supplying electric power further comprises eight 1.5 volt D.C. size C batteries.

10. The fish repelling electrical prod of claim 9 wherein said batteries are serially housed inside said casing.

11. The fish repelling electrical prod of claim 1 further comprising an indicator light means electrically connected to said ON and OFF switch wherein said light turns ON when said switch is ON.

12. The fish repelling electrical prod of claim 11 wherein said indicator light means further comprises a light emitting diode.

13. The fish repelling electrical prod of claim 1 wherein said insulated mounting bracket further comprises a Y-shaped bracket which holds said prongs approximately one and a half inches apart.

14. The fish repelling electrical prod of claim 13 wherein said prongs further comprise exposed lead wires wrapped in a parallel fashion around the sides of said Y-shaped bracket functioning to allow said sides of said bracket to touch a conductive object such as a fish and discharge electrical energy therein.

* * * * *